United States Patent
Obrecht et al.

(10) Patent No.: US 9,416,771 B2
(45) Date of Patent: Aug. 16, 2016

(54) METHOD FOR CONTROLLING LOADS IN A WIND TURBINE

(71) Applicants: John M. Obrecht, Louisville, CO (US); Karsten Schibsbye, Fredericia (DK)

(72) Inventors: John M. Obrecht, Louisville, CO (US); Karsten Schibsbye, Fredericia (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 677 days.

(21) Appl. No.: 13/927,272

(22) Filed: Jun. 26, 2013

(65) Prior Publication Data

US 2015/0003981 A1    Jan. 1, 2015

(51) Int. Cl.
 *F03D 7/02*  (2006.01)
 *F03D 1/06*  (2006.01)

(52) U.S. Cl.
 CPC ............ *F03D 7/0268* (2013.01); *F03D 1/0633* (2013.01); *F03D 7/0224* (2013.01); *F05B 2270/321* (2013.01); *Y02E 10/721* (2013.01); *Y02E 10/723* (2013.01)

(58) Field of Classification Search
 CPC .... F03D 7/0224; F03D 7/0268; F03D 1/0633
 See application file for complete search history.

(56) References Cited

U.S. PATENT DOCUMENTS

| | | | |
|---|---|---|---|
| 4,310,284 A | 1/1982 | Randolph | |
| 4,462,753 A | 7/1984 | Harner et al. | |
| 4,582,013 A | 4/1986 | Holland, Jr. | |
| 5,226,805 A | 7/1993 | Proven | |
| 5,286,166 A | 2/1994 | Steward | |
| 5,616,963 A | 4/1997 | Kikuchi | |
| 6,441,507 B1 | 8/2002 | Deering et al. | |
| 7,172,392 B2 | 2/2007 | Wastling et al. | |
| 7,476,985 B2 | 1/2009 | Llorente Gonzalez | |
| 7,719,128 B2 | 5/2010 | Kammer et al. | |
| 7,789,624 B2 | 9/2010 | Appa et al. | |
| 7,964,979 B2 | 6/2011 | Miranda et al. | |

(Continued)

FOREIGN PATENT DOCUMENTS

| | | |
|---|---|---|
| EP | 2003335 A2 | 12/2008 |
| EP | 2141355 A2 | 1/2010 |

(Continued)

OTHER PUBLICATIONS

Veers et al.; "Load Attenuating Passively Adaptive Wind Turbine Blade"; U.S. Statutory Invention Registration No. H2057 H; published Jan. 7, 2003.

*Primary Examiner* — Nathaniel Wiehe
*Assistant Examiner* — Woody A Lee, Jr.

(57) ABSTRACT

A method for controlling aerodynamic loads in wind turbine (20), includes stopping rotation of blades (22) of the turbine about a rotor shaft axis (38); stopping rotation of a nacelle (30) of the turbine about a vertical yaw axis (36); pitching each blade of the turbine about its respective pitch axis (43) into a stable pitch angle range (52B-52C or 52E-52F) in which a resulting root twisting moment (52) created by a current wind loading (48, 50) on the respective blade is in a direction urging pitch rotation of the blade toward a position of lower root twisting moment; and releasing the blades to rotate passively about their respective pitch axes during subsequent changing wind directions ($V_{R1}$). A blade may be designed to better align a root zero twisting moment (52A, 52D) in the stable pitch angle range with a minimum (48B, 48D, 50B, 50D) wind loading.

20 Claims, 5 Drawing Sheets

(56) References Cited

U.S. PATENT DOCUMENTS

| | | | |
|---|---|---|---|
| 7,994,650 B2 * | 8/2011 | Stommel | F03D 1/0675 290/44 |
| 8,277,167 B2 | 10/2012 | Shibata et al. | |
| 8,283,798 B2 | 10/2012 | Siebers et al. | |
| 8,360,724 B2 | 1/2013 | Yoshida | |
| 9,127,644 B2 * | 9/2015 | Friedrich | F03D 7/0228 |
| 2005/0201862 A1 * | 9/2005 | Wastling | F03D 7/0224 416/98 |
| 2006/0002793 A1 | 1/2006 | Yoshida | |
| 2010/0104444 A1 | 4/2010 | Garcia Andujar et al. | |
| 2011/0052404 A1 | 3/2011 | Zuteck | |
| 2011/0135471 A1 | 6/2011 | Wangford | |
| 2012/0294714 A1 * | 11/2012 | Friedrich | F03D 7/0228 416/1 |

FOREIGN PATENT DOCUMENTS

| | | |
|---|---|---|
| EP | 2525084 A2 | 11/2012 |
| WO | 0171183 A1 | 9/2001 |

* cited by examiner

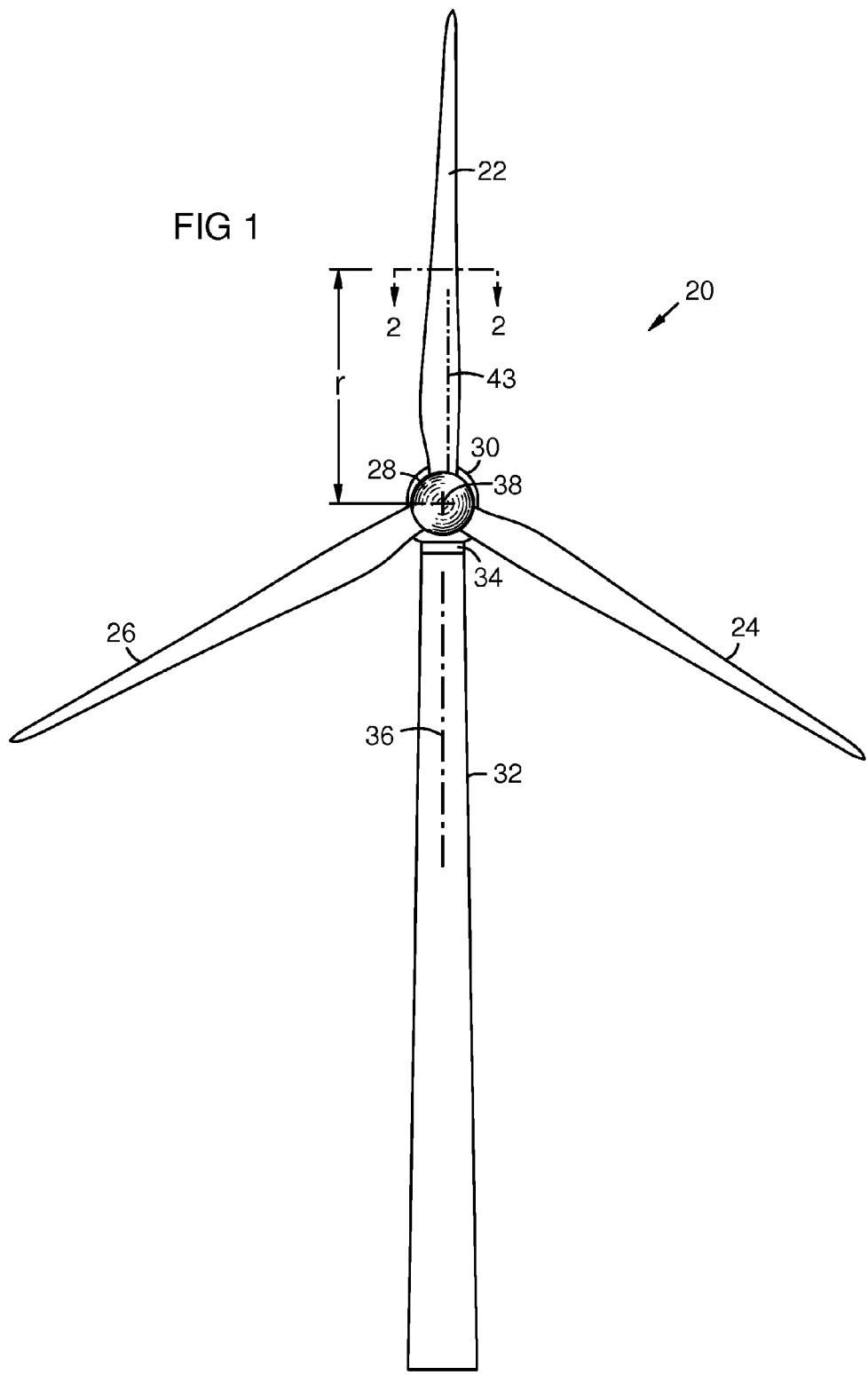

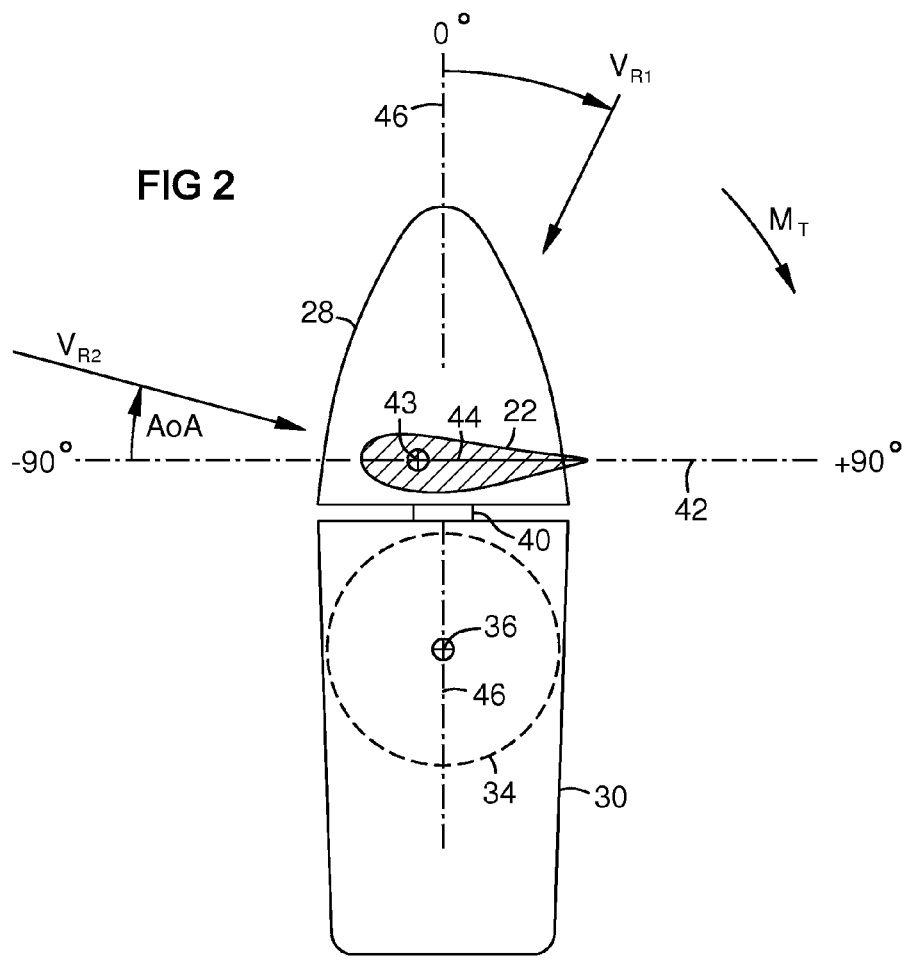
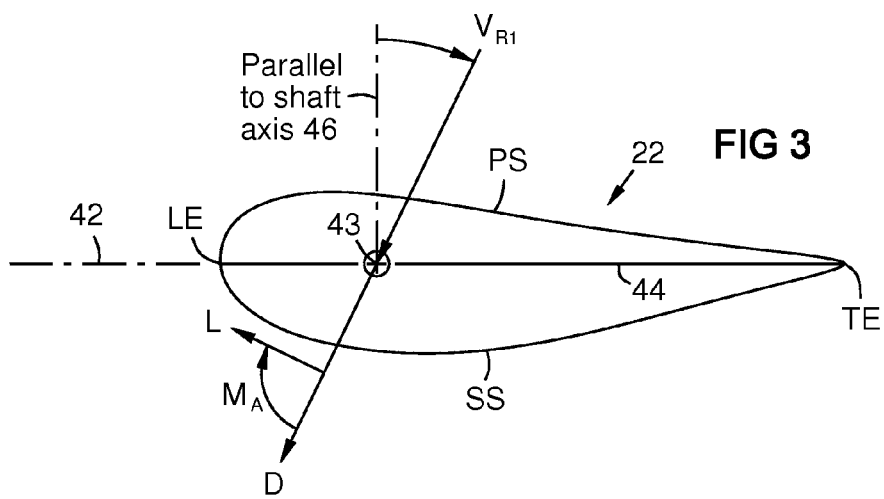

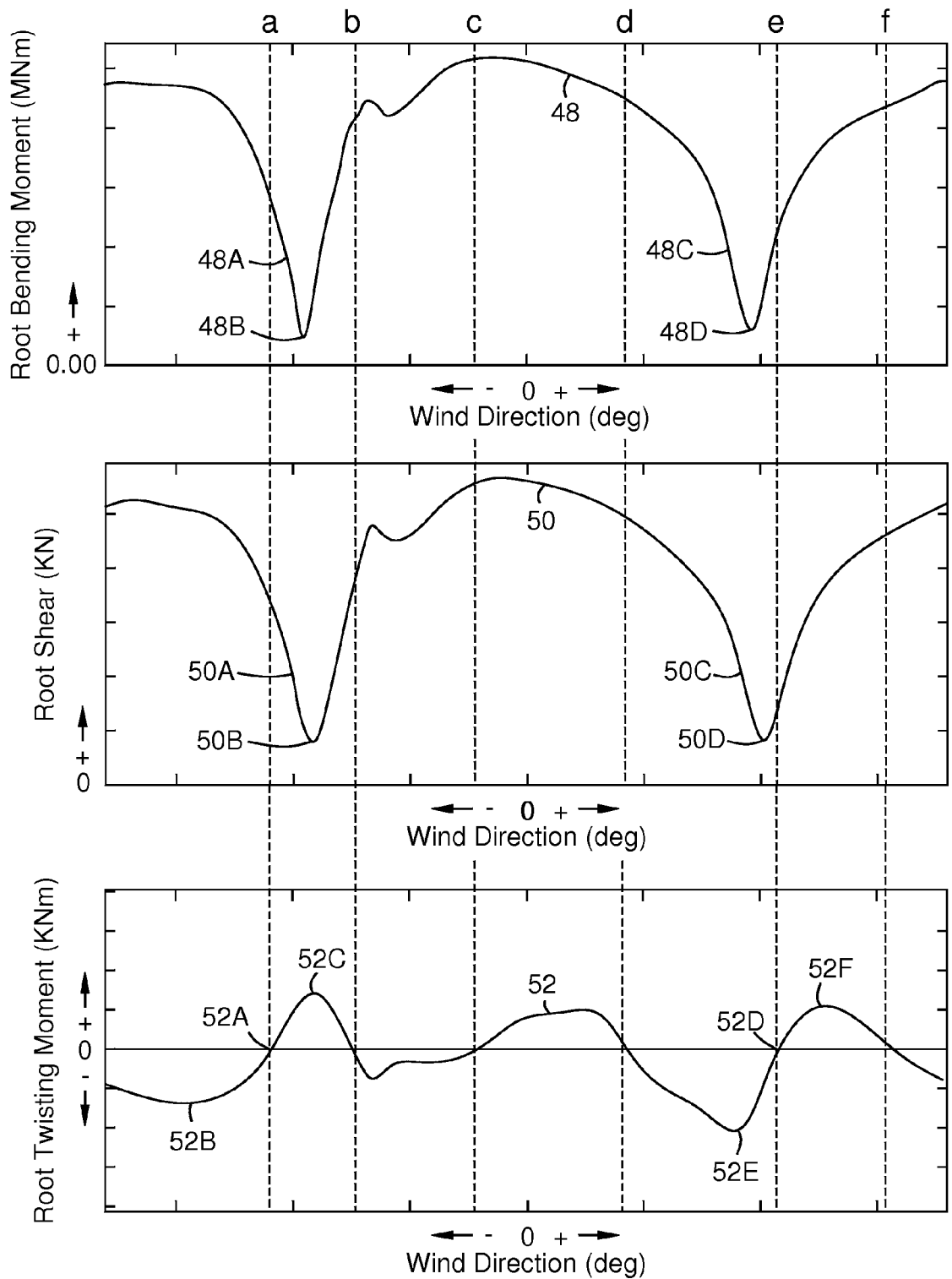

METHOD FOR CONTROLLING LOADS IN A WIND TURBINE

FIELD OF THE INVENTION

The invention relates generally to wind turbines and more particularly to minimizing aerodynamic structural loading in a parked wind turbine.

BACKGROUND OF THE INVENTION

The cost efficiency of a wind turbine increases with rotor diameter, but blade length and design are often limited by maximum wind loads during storms. When a wind turbine is operating, a yaw control keeps the nacelle and rotor shaft aligned with the wind. However, when high winds are detected or forecast, the yaw position may be locked. In this condition, the wind can come from any direction relative to the nacelle. Winds that are broadside to the blade can cause excessive stress on the blade and all supporting parts. For this reason, blades may be actively feathered to align their chord lines with the wind. Active feathering requires constant blade pitch adjustment as wind direction changes. If the rotor is parked for safety, no power is being generated. If the power grid fails, there is no power for the active pitch controls, so an auxiliary power unit is required, which itself is subject to failure. When power for pitch control is unavailable, the blades may be subjected to excessive bending and twisting forces in high winds.

BRIEF DESCRIPTION OF THE DRAWINGS

The invention is explained in the following description in view of the drawings that show:

FIG. 1 is a front view of a wind turbine with a first blade in a vertical azimuth position according to an aspect of the invention.

FIG. 2 is a sectional top view of the vertically oriented blade taken along line 2-2 of FIG. 1.

FIG. 3 is an enlargement of the blade airfoil section of FIG. 2.

FIG. 4 shows interrelated function curves for root bending moment, root shear, and root twisting moment computed over a full range of relative wind directions.

DETAILED DESCRIPTION OF THE INVENTION

Figure 5:
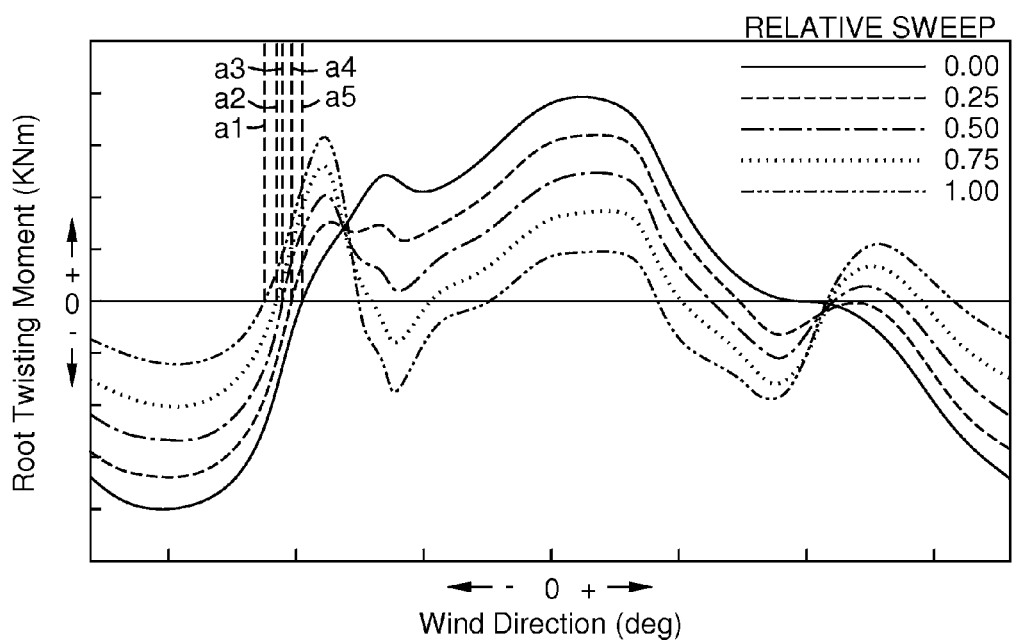
FIG. 5 shows root twisting moment curves for different amounts of sweep relative to a given "full" sweep of 1.00.

FIG. 1 is a front view of a wind turbine (WT) 20, with three blades 22, 24, 26 mounted radially to a hub 28, which is mounted on a rotor shaft (not visible) extending from a nacelle 30, which is mounted on a tower 32 via a yaw bearing 34 that provides rotation of the nacelle about a yaw axis 36. The blades, hub, and shaft constitute a rotor that rotates about a horizontal rotor shaft axis 38. A radial position r is indicated. Each blade pivots controllably about a respective pitch axis 43. The vertical blade is shown in the zero azimuth position. It may be locked in this position when high winds are detected or forecast in order to minimize total bending moments on the tower and to distance the blades from eddies around the tower.

FIG. 2 is a sectional top view of a vertically oriented blade 22 radially mounted to a hub 28 on a horizontal rotor shaft 40, which drives a generator (not shown) in the nacelle 30. The blade rotates in a vertical plane 42. The blade pivots about a pitch axis 43, which may be located at or near the ¼ chord position as shown, or at some other position. In FIG. 2 the yaw, azimuth, and pitch are parked (stationary), with the airfoil's chord line 44 aligned with the plane of rotation 42. The incoming wind vector $V_{R1}$ relative to the nacelle is defined as zero degrees when it is from the front and parallel to the shaft axis 46. The relative wind angle increases clockwise in this view, so it is 90° when coming from the right, and −90° when coming from the left. An angle of attack AoA is defined between the chord line 44 of the blade and the relative wind vector $V_{R1}$, $V_{R2}$. An angle of attack is defined for any wind direction ϕ relative to the blade as follows:

$$AoA(r,\theta) = \phi + 90° - \beta(r) - \theta$$

Where
r = radius from the rotor axis
θ = pitch angle
ϕ = relative wind direction
β(r) = twist angle (pitch built-in to blade at a given radius)

An exemplary relative wind direction $V_{R2}$ for this calculation is shown at −75°. If the pitch and twist angles are zero at the given radius r, then the angle of attack for $V_{R2}$ is: AoA = −75° + 90° − 0° − 0° = 15°. The AoA is used for computing aerodynamic loads. However, the graphs shown herein use the wind direction convention of $V_{R1}$ (0 to 180° clockwise, and −0 to −180° counterclockwise from the shaft axis 46), with the airfoil chord 44 parallel to the rotation plane 42 as shown in FIG. 2. This provides graphs that show where to direct the pitch relative to the rotor shaft axis 46 to reach a stable valley of the wind loading curves as later described.

FIG. 3 shows a enlargement of the blade airfoil section of FIG. 2, with a leading edge LE, trailing edge TE, pressure side PS, and suction side SS. A pitch axis 43 may be located at or near the aerodynamic center of the airfoil along at least part of the blade span. However, the aerodynamic center can vary with radial position relative to the pitch axis due to the changing shape, taper, and sweep of the blade. The pitch axis may be outside the blade on swept portions of the blade and when the blade is bent forward by pre-bend or backward by the wind. The drag vector D has the same direction as the wind. The lift vector L is perpendicular to the wind. The positive direction for the lift vector is shown, even though lift for some wind directions urges the airfoil backwards. Vector lengths are not to scale. The aerodynamic moment $M_A$ is positive clockwise in this view.

FIG. 4 shows function curves computed for root bending moment 48, root shear 50, and root twisting moment 52. These curves are interrelated by vertical lines a, b, c, d, e, f, which cross positions on the bottom curve 52 where the root twisting moment is zero. In three cases a, c, e, the slope of the twisting moment 52 is positive at the zero crossing point. In the other cases b, d, f, the slope of the twisting moment curve 52 is negative at the zero crossing point. Where the slope is positive, direction changes in the relative wind $V_{R1}$ urge the blade toward zero twist, because a higher wind angle causes positive blade twist, which rotates the blade clockwise in FIG. 2, thus reducing the relative wind angle; and a lower wind angle causes negative twist, which rotates the blade counterclockwise to a greater relative wind angle. This condition may be called a stabilizing slope about the zero crossing point of the twist moment curve. Stable pitch angle ranges under consideration herein are 52B-52C and 52E-52F.

Two of the stable zero twist positions 52A and 52D occur within respective pairs of stress valleys 48A/50A and 48C/50C. Thus, if the blade pitch control is released to allow the pitch to change freely anywhere in the range of 52B-52C or 52E-52F, the blade will passively seek the respective zero twisting moment position 52A, 52D, and will stay within the wind load valleys 48A/50A or 48C/50C. For exemplary purposes herein, the shapes of the two wind load curves 48 and 50 are nearly the same in that they have peaks and valleys at essentially the same positions. So the term "wind load valley" or "load valley", means a valley in either one of the curves 48 or 50 or a combination of them. The minima 48B, 48D, 50B, 50D of the bending and shear curves 48, 50 occur with the chord line 44 generally aligned or anti-aligned with the wind $V_{R1}$. The zero twist line "a" occurs with the leading edge LE into the wind, while zero twist line "e" occurs with the trailing edge TE into the wind. In the particular model used for these graphs, the minima 48D and 50D are closer to the zero line "e" than the minima 48B, 50B are to the zero line "a". To utilize this fact, an option is to pitch the trailing edge into the wind before releasing the pitch control. However, another option is to design the blade so that the minima 48B and/or 50B are closer to, or aligned with, the zero twist line "a". For example, the blade may be designed such that the average distance of the two minima 48B and 50B from the zero twist line "a" is minimized. Alternatively, the blade may be designed such that each of the valley minima are at or proximate (within 5-10 degrees) the zero twist line.

FIG. 5 shows root twisting moment curves for five different amounts of sweep relative to a given "full" sweep of 1.00. While not meant to be limiting but simply as an example, if full sweep is 2 meters backward at the blade tip, then 0.50 sweep is 1 meter backward at the tip. The inventor realized that stress could be minimized under passive pitch control if the positions of the minima of the wind load curves 48 and 50 were modified to coincide with at least one of the zero twist lines "a" and/or "e". Sweep amount and/or shape can be used to adjust the zero twist crossing points a1-a5 as shown.

Figure 6:
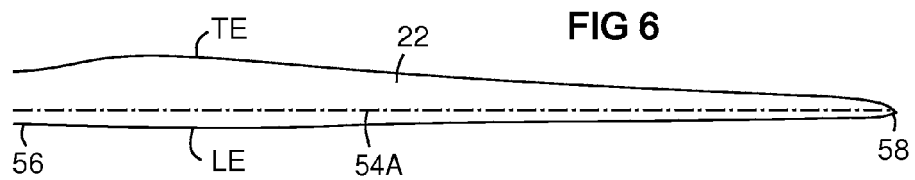
FIG. 6 schematically shows a blade with a profile curve passing through its ¼ chord points from root to tip.
Figure 7:
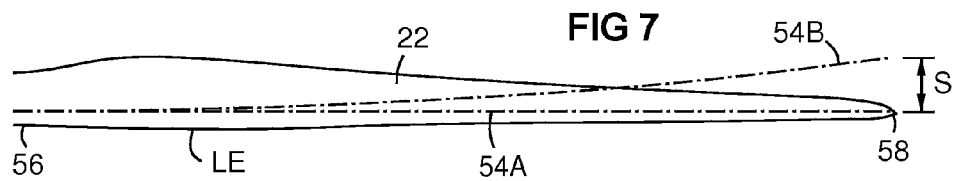
FIG. 7 shows a profile curve for a swept back blade.
Figure 8:
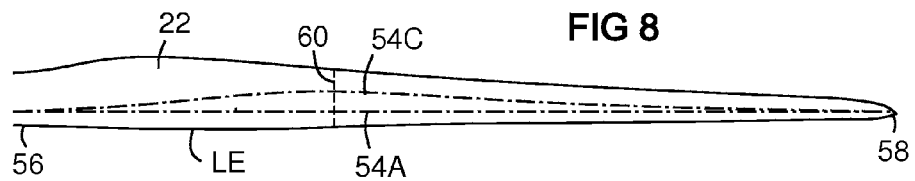
FIG. 8 shows a profile curve for a blade that is swept back at an intermediate radial position.
Figure 9:
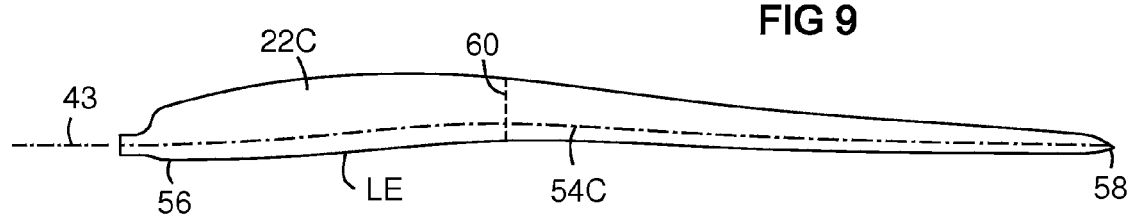
FIG. 9 shows a blade as designed per FIG. 8.

FIG. 6 schematically shows a front profile or planform of a blade 22, with a blade profile curve 54A passing through its ¼ chord points from root 56 to tip 58. FIG. 7 shows a profile curve 54B for a swept back blade. This curve may fit a function such as Sweep $(r)=S*(r/R)^2$, where S is the amount of sweep at the tip 58, such as 2.0 meters, and r/R is the proportion of the blade span (radial position/rotor radius). FIG. 8 shows a profile curve 54C for a blade that is swept back at an intermediate radial position. The backward sweep may be continued to a chord line 60, and then swept forward to the tip 58, forming a mildly backward-pointing V-shaped or U-shaped profile. The chord 60 may be chosen because increasing the influence of its built-in pitch or twist moves the zero twist point "a" of FIG. 4 closer to one or more of the minima 48B, 48D, 50A, 50D. Thus the blade profile curve 54C may be shaped to specify a blade planform that is swept back at any particular radial position where the sweep is most effective to align a zero twist line "a" of FIG. 4 with a minimum of a load curve 48, 50. FIG. 9 shows a planform of a blade 22C designed per FIG. 8. Other blade modifications can be made to achieve this result, such as increasing the chord length of the blade at the chosen radial position or changing the camber shape.

The neutral pitch condition allowing the blade pitch to rotate passively may be provided by motor-driven gears that are engaged and disengaged by a solenoid as with an engine starter. For example, a solenoid may move a drive pinion on the motor shaft to mesh with a ring gear on the pitch shaft of the blade. Alternate means, such as a clutch or a hydraulic drive system with pressure relief valving to allow free rotation may be used. The pitch drive system may be designed to disengage from the blade in a default condition without power, thereby allowing the blade to passively pitch without angular limit. A damping mechanism such as a partial brake or clutch may be provided to prevent flutter.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of operating a wind turbine, the method comprising:
    stopping rotation of blades of the wind turbine about a rotor shaft axis;
    stopping rotation of a nacelle of the wind turbine about a vertical yaw axis;
    pitching each blade of the wind turbine about a respective pitch axis into a pitch angle range wherein a resulting root twisting moment created by a current wind loading on the respective blade is in a direction urging pitch rotation of the blade toward a position of lower root twisting moment; and
    releasing the blades to rotate passively about their respective pitch axes during subsequent changing wind directions.

2. The method of claim 1, further comprising pitching each blade into a pitch angle wherein both root moment and root shear loads of the blade are within respective load valleys on a graph of those respective loads verses wind direction.

3. The method of claim 1, further comprising selecting a shape parameter of each blade to position a minimum in at least one of root bending moment and root shear loading to be proximate a pitch position of zero root twisting moment with respect to the changing wind directions.

4. The method of claim 1, further comprising providing a neutral pitch mode wherein each blade rotates independently and passively about its respective pitch axis without angular limit under the influence of twisting moments caused by the changing wind directions.

5. The method of claim 1, further comprising providing an active pitch control that pitches each blade over a range of at least 360 degrees, and providing a neutral pitch mode wherein each blade rotates independently passively about the respective pitch axis without angular limit under the influence of twisting moments caused by the current wind loading.

6. The method of claim 1, further comprising providing each of the blades with a sweep amount and shape that minimizes a distance between a minimum in the current wind loading and a pitch position of zero twist moment over the changing wind directions.

7. The method of claim 1, further comprising providing each of the blades with a backward sweep maximized at a selected radius of the blade, wherein an influence of the backward sweep minimizes a distance between a pitch position providing a minimum in at least one of a current root bending moment and a current root shear compared to a pitch position of zero twist moment with respect to wind direction with a leading edge of the blade into the wind.

8. The method of claim 7, further comprising providing each blade to comprise a backward sweep from a root of the blade to the selected radius, and a forward sweep from the selected radius to a tip of the blade.

9. A method of operating a wind turbine, the method comprising:
- providing a blade of the wind turbine such that both root moment and root shear loads in the blade are within respective load valleys on a graph of those respective loads verses wind direction when the blade is at a passively stable pitch angle wherein the root twisting moment has a value of zero and a stabilizing slope on a graph of root twisting moment verses the wind direction;
- parking the wind turbine by stopping rotation of the blade about a turbine rotation axis and about a yaw axis;
- pitching the blade into the passively stable pitch angle for an existing wind direction; and
- releasing the blade to rotate passively about a pitch axis in response to changing wind directions.

10. The method of claim 9, further comprising providing the blade to produce a respective minimum in the respective load valleys proximate the stable pitch angle with zero root twisting moment with respect to the changing wind directions.

11. The method of claim 9, further comprising providing the blade to produce a respective minimum in the respective load valleys at the stable pitch angle with zero root twisting moment with respect to the changing wind directions.

12. The method of claim 9, further comprising providing a neutral pitch mode wherein the blade rotates independently and passively about the pitch axis without angular limit under the influence of twisting moments caused by the changing wind directions.

13. The method of claim 9, further comprising providing an active pitch control that pitches the blade over a range of at least 360 degrees, and providing a neutral pitch mode wherein the blade pitches passively about the pitch axis without angular limit under the influence of twisting moments caused by the changing wind directions.

14. The method of claim 9, further comprising providing the blade with a sweep amount and shape that minimizes an average distance between respective minima in the root moment and root shear loads and a pitch position of zero twist moment over the changing wind directions.

15. The method of claim 9, further comprising providing the blade with a backward sweep maximized at a selected radius of the blade, wherein an influence of the backward sweep minimizes an average distance between respective minima in the root moment and root shear loads compared to a pitch position of zero twist moment with respect to wind direction with a leading edge of the blade into the wind.

16. The method of claim 15, further comprising providing the blade to comprise a backward sweep from a root of the blade to the selected radius, and a forward sweep from the selected radius to a tip of the blade.

17. A method of operating a wind turbine, the wind turbine comprising a blade mounted on a horizontally rotatable shaft, which is in turn mounted in a nacelle with a vertical yaw axis, the method comprising:
- pitching the blade into an aerodynamically stable pitch angle range wherein the blade passively seeks a pitch angle that stays within a valley of aerodynamic structural loading on the blade during changing wind directions; and
- releasing the pitch of the blade to a neutral pitch condition with unlimited freedom of pitch angle.

18. The method of claim 17 further comprising locking the yaw axis in a fixed yaw position of the nacelle and locking the shaft in a fixed respective azimuth position of the blade prior to the step of pitching the blade.

19. The method of claim 18 wherein the wind turbine includes exactly three blades, and further comprising locking the rotor shaft with one of the blades oriented vertically upward.

20. The method of claim 17, wherein the aerodynamically stable pitch angle range comprises a trailing edge of the blade facing upwind.

* * * * *